March 2, 1943.   H. L. BALDWIN   2,312,518
TRACTION DEVICE
Filed Aug. 29, 1940
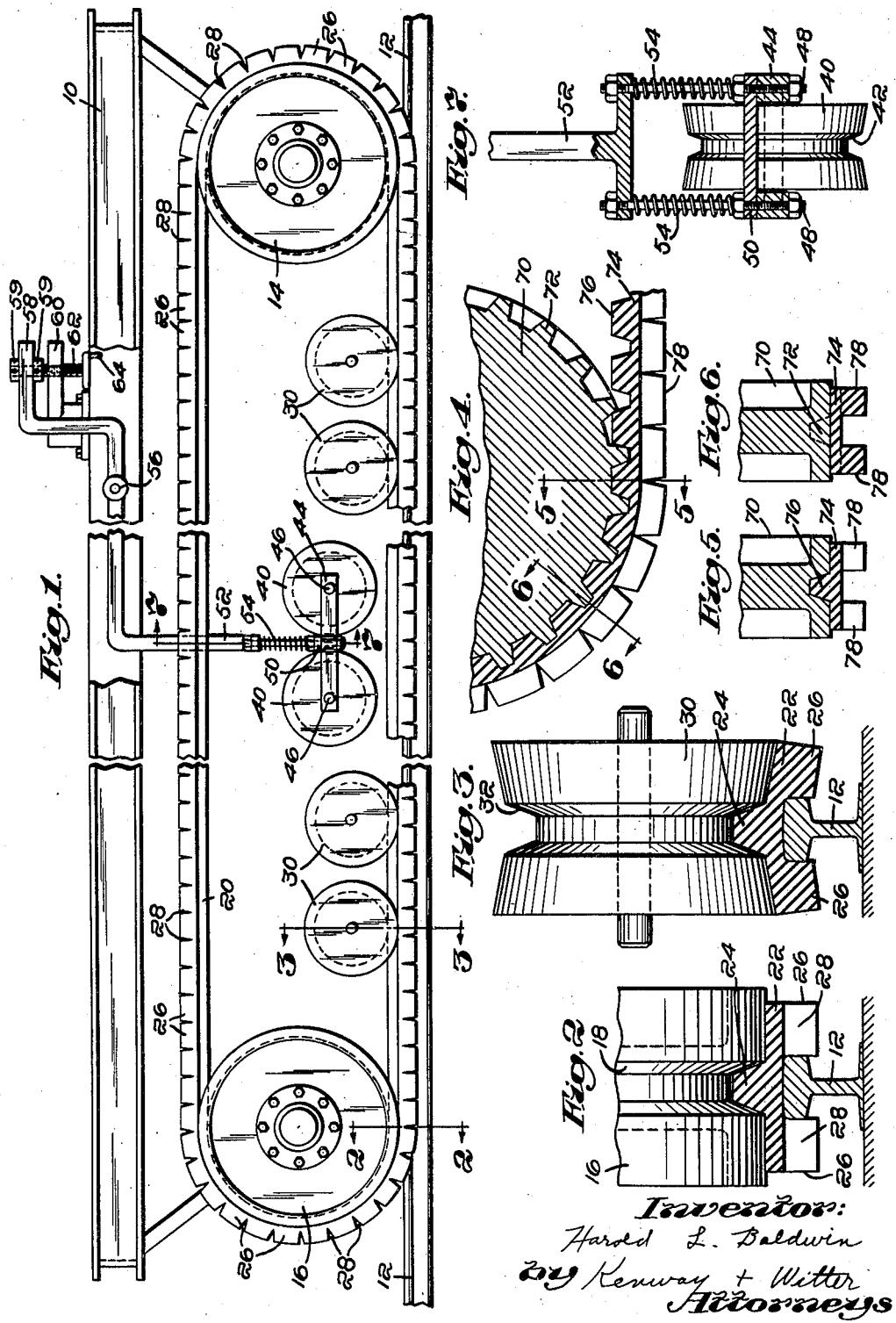

Patented Mar. 2, 1943

2,312,518

UNITED STATES PATENT OFFICE 2,312,518

TRACTION DEVICE

Harold L. Baldwin, Bingham, Maine

Application August 29, 1940, Serial No. 354,722

6 Claims. (Cl. 105—30)

My invention relates to rail transportation and consists in a new and improved traction device having in a special belt, driving wheels, and rollers by means of which great traction is developed and a relatively small motor or locomotive enabled to pull a heavy load up a steep grade.

In large scale lumbering operations the most practical method of transporting logs to a shipping point or to a river is by a narrow gauge railway using light rails which can be moved from place to place conveniently to follow the cutting operations. However, such a system has heretofore been found impractical in locatities where steep grades are encountered, since it is not profitable to go to the expense of grading the road bed for the rails to avoid slopes naturally encountered.

The most important object of my invention is to provide a traction equipment device by means of which any available light locomotive running on rails may be fitted at moderate expense to draw heavy loads up relatively steep grades.

An important feature of my invention resides in an endless flexible belt adapted to fit around the wheels of a locomotive and provided on its outer face with a pair of opposed slotted flanges forming between them a relatively narrow channel shaped to embrace the top and upper side portions of a rail.

A further feature of my invention consists in the provision of concave rollers disposed at spaced intervals between the wheels of a locomotive and arranged to force the belt against the top of the rail and to shape and press the flanges into contact with the upper side portions of the rail.

The most important advantage resulting from the use of my invention is the fact that a light, narrow gauge rail system can be used in steeply graded areas more efficiently and with a greater saving in cost than other transportation systems. It will be evident that the use of my invention is not confined to lumbering operations but may advantageously be operated, for example, in conjunction with mining, quarrying, and military operations.

These and other objects and features of my invention will be more readily understood and appreciated from the following detailed description of a specific embodiment thereof selected for purposes of illustration and shown in the accompanying drawing in which—

Fig. 1 is a view in side elevation of portions of a locomotive equipped with my improved traction device, the details of the locomotive being omitted for the sake of clarity, Fig. 2 is a view in cross section of one of the wheels of the locomotive taken along the line 2—2 of Fig. 1, Fig. 3 is a view in cross section of one of the concave rollers taken along the line 3—3 of Fig. 1, Fig. 4 is a view in cross section through a wheel and the belt of a modified form of the invention, Fig. 5 is a view in cross section taken along the line 5—5 of Fig. 4, Fig. 6 is a view in cross section taken along the lines 6—6 of Fig. 4, and Fig. 7 is a view in cross section taken along the lines 7—7 of Fig. 1.

It should first be stated that my invention is not limited to any particular type of locomotive and the term "locomotive" as used herein includes steam locomotives, Diesel locomotives, and power cars operated by any of the conventional sources of power. In Fig. 1 I have shown a frame 10 of I beams which may be taken as representing the chassis of any locomotive. The locomotive is provided with a pair of driving wheels 14 (of which only one appears in the drawing) and driven wheels 16 arranged to run over rails 12 of conventional shape. The wheels 14 and 16, as shown in Fig. 2, are cast with a V-shape groove 18 in their outer periphery. Stretched over the wheels 14 and 16 is an endless flexible belt indicated generally by the reference character 20 and consisting of a flat rectangular base 22 on the inner side of which is a V-shaped flange 24 dimensioned to fit into the grooves 18 on the circumferential surfaces of the wheels 14 and 16. It will be apparent that the provision of the complementary grooves 18 and the flange 24 results in a relatively large area of contact between the belt and the wheels and minimizes the possibility of the wheels slipping within the belt. On the outer surface of the base 22 I provide the belt with a pair of opposed flanges 26 which form between them a channel as wide as the top of the rail 12. The flanges 26 are interrupted by slots 28 which permit the belt 20 to pass over the wheels 14 and 16 without distortion or strain, since the slots 28 open in that portion which is curved about either of the wheels and close when that portion of the belt is between the wheel. It will be apparent that the belt is in contact not only with the top of the rail, but also with the sides of the rail and the friction of the belt on the rail is so great that the locomotive can pull a tremendous weight up a steep grade without losing traction. If the belt were not used the area of contact between the wheels and the rails would be small and the wheels would slip relative to the rails whenever the load or the grade became at all extreme. The belt, in effect, serves to increase enormously the area of traction contact between the wheels and the rails.

In order to obtain an added degree of efficiency I provide eight rollers 30, four on each side of the locomotive, which are disposed between the wheels 14 and 16 in such a way that the rollers 30 force the belt 20 against the rail 12. The periphery of each roller 30 is laterally concave and a V-shaped groove 32 is provided in the central portion thereof. The grooves 32 accommodate the flange 24 on the belt and the concave surfaces of the rollers flex its base portion 22 transversely and progressively and thus temporarily force the inner surfaces of the flanges 26 into clinging engagement with the sides of the rail 12. It will be understood that the pitch of the concave rollers is not so extreme that the sides of the flanges are caused to grip the rail tightly and thus to brake the locomotive but are designed merely to ensure good contact between the flanges and the sides of the rail. Although grooved and concave rollers are most efficient, rollers with flat peripheries bearing only on the top of the flange 24 of the belt may be used to good effect.

The structure described thus far forms a complete traction improving device and has proved successful in practice. For use in connection with extreme grades and enormous loads I have devised an additional traction improving means suitable for use with the structure heretofore described. The optional structure consists essentially in an additional set of concave rollers, preferably used in pairs. As shown in Fig. 7 each of the rollers 40 is provided with a V-shaped groove 42, and the periphery thereof is concave, just as the rollers 30. A pair of rollers may be mounted in a frame 44 and adapted to revolve on journals 46 carried by the frame 44. On each side of the central portion of the frame 44 is a vertical bolt 48 connected by a tie rod 50 and secured at their upper ends to a link 52. The bolts 48 slide freely in the link 52, and heavy compression springs 54 surround the bolts 48 and tend to separate the link 52 from the frame 44. The link 52 is bent at right angles at its upper end and runs parallel and inside of the frame 10. A stud 56 mounted in the frame 10 projecting inwardly therefrom serves as a pivot for the link 52 which extends upwardly after it leaves the pivot point and terminates in a horizontal section 58. Threaded in a bracket 60 on the locomotive chassis is a rod 62 provided at its lower end with a hand wheel 64. The rod 62 turns freely in the section 58 of the link 52 and is held in fixed relation to the section 58 by a pair of collars 59. When the hand wheel 64 is rotated to elevate the rod 62, the upper section 58 on the link 52 is elevated with the result that the frame 44 and the rollers 40 are lowered until the rollers 40 engage the belt 20 and press it against the rail 12. The amount of pressure exerted by the rollers 40 on the belt can be varied according to the setting of the hand wheel 64. When the hand wheel is rotated to lower the rod 62 the section 58 of the link is drawn down and the rollers are lifted from engagement with the belt 20. The mechanism shown for raising and lowering the rollers 40 is illustrative, and any suitable means for accomplishing the same result may be substituted therefor. The rollers 40, and their associated mechanism may be used as emergency equipment or as general equipment, according to the conditions encountered.

At greater cost an even more efficient traction device may be constructed according to my invention. As shown in Figs. 4–6 a wheel 70, representative of both driving and driven wheels may be provided at its periphery with spaced teeth 72 forming, in effect, a sprocket. A belt 74 is provided with a V-shaped flange 76 on its inner surface in which are formed corresponding teeth meshing with the teeth 72 on the wheel 70. The belt is also provided with opposed flanges 78 on its outer surface for gripping a rail as has already been explained. This arrangement of the belt and the wheel provides a more efficient translation of the driving power from the wheel to the belt, and its usefulness will be evident to those skilled in the art.

The belt 20 may be constructed of any flexible and elastic materials which are sufficiently sturdy to stand up in use. I have successfully used a belt comprising a fabric base or core upon which rubber has been vulcanized. However, other compositions may prove satisfactory.

It will now be seen that I have invented a traction device which renders it possible to use a light railway system for drawing heavy loads up steep grades. A combination of the special belt, the grooved locomotive wheels, and the rollers results in a great saving of power, since a larger percentage of the power applied to the driving wheels is applied to the load to be drawn. My invention is not limited to the embodiments disclosed in the drawing and described herein in detail, but since there are many variations which will occur to those skilled in the art when the principle is once understood.

Having thus described and illustrated my invention what I claim as new and desire to secure by Letters Patent of the United States is:

1. Traction mechanism for locomotives, comprising spaced wheels having grooved circumferential faces, an endless flexible belt running upon said wheels and having a groove-fitting projection and a normally flat base provided with laterally spaced parallel flanges providing a rail-engaging tread surface therebetween, and an intermediate roll mounted between said grooved wheels in position to engage the inner face of the endless belt and having a concave circumferential face arranged progressively to flex the belt transversely and force its flanges temporarily toward each other in passing the said roll.

2. Traction mechanism for rail locomotives, comprising spaced grooved wheels on the locomotive chassis, an endless flexible belt running upon said wheels and having an inwardly directed flange fitting in the grooves thereof and a normally flat base portion providing a rail-engaging tread surface and carrying outwardly directed flanges spaced to receive the rail between them, the said wheels being shaped to support the endless belt in flat condition in passing about them, and conforming rolls of concave contour arranged to flex the said belt at an intermediate point between said spaced wheels and force its flanges into temporarily clinging engagement with the rail beneath it.

3. Traction mechanism for rail locomotives, comprising a chassis with spaced grooved wheels, an endless flexible belt running upon said wheels and having an inwardly directed flange fitting in the grooves thereof and a normally flat base portion provided with a rail-engaging tread surface and outwardly directed flanges spaced to receive the rail between them, and a roll normally out of contact with the said belt and having a concave circumference, and means for moving the said roll downwardly and holding it in conforming engagement with the inner face of the endless belt at a point between the said spaced wheels thereby temporarily forcing the flanges of the belt into clinging engagement with the sides of the rail.

4. Traction mechanism for rail locomotives of the character defined in claim 3, in which the conforming roll is provided with yielding positioning means so that it follows all variations in the path of the moving belt.

5. Traction mechanism for rail locomotives of the character defined in claim 3, in which the conforming rail is carried by a member pivotally mounted upon the locomotive chassis, said member being provided at its upper end with manually operated adjusting means and at its lower ends with a vertically yieldable carriage for the roll, whereby the roll may be held against the inner face of the endless belt with yielding pressure of adjustable degree.

6. Traction mechanism for a rail locomotive comprising spaced wheels for carrying the locomotive, an endless flexible belt having a rail-engaging tread surface and laterally spaced external flanges running about said wheels and maintained by them normally flat in transverse cross section, and means located between said carrying wheels for progressively flexing the belt temporarily to contract its external flanges into clinging engagement with the rail beneath it.

HAROLD L. BALDWIN.

CERTIFICATE OF CORRECTION.

Patent No. 2,312,518. March 2, 1943.

HAROLD L. BALDWIN.

It is hereby certified that error appears in the printed specification of the above numbered patent requiring correction as follows: Page 3, second column, line 2, for "rail" read --roll--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.